United States Patent [19]

Lepera et al.

[11] 4,167,920

[45] Sep. 18, 1979

[54] METHOD AND APPARATUS FOR INCREASING THE POWER OF INTERNAL COMBUSTION ENGINES BY OXYGEN INJECTION

[76] Inventors: Eugene D. Lepera, 1346 Saxe Rd., Mogadore, Ohio 44260; Clarence E. Ritenour, 470 Lodi St., Akron, Ohio 44305

[21] Appl. No.: 837,396

[22] Filed: Sep. 28, 1977

[51] Int. Cl.² .............................................. F02D 21/02
[52] U.S. Cl. ............................. 123/1 A; 123/DIG. 12
[58] Field of Search .......... 123/1 A, DIG. 1, DIG. 6, 123/DIG. 7, DIG. 12, 3, 26, 27 GE

[56] References Cited

U.S. PATENT DOCUMENTS

| | | | |
|---|---|---|---|
| 2,715,395 | 8/1955 | Finuold | 123/1 A |
| 2,838,034 | 6/1958 | Clark | 123/1 A X |
| 3,572,297 | 3/1971 | Murray | 123/1 A |
| 3,608,660 | 9/1971 | Smith et al. | 123/1 A X |
| 3,696,795 | 10/1972 | Smith et al. | 123/1 A |
| 3,877,450 | 4/1975 | Meeks | 123/1 A X |
| 3,885,387 | 5/1975 | Simington | 123/DIG. 7 X |

*Primary Examiner*—Ira S. Lazarus
*Attorney, Agent, or Firm*—Reese Taylor

[57] ABSTRACT

A method and apparatus for increasing the power of internal combustion engines is disclosed and includes the method step of injecting pure oxygen, under pressure, into the combustion chamber of the engine after ignition of the usual fuel mixture. The apparatus includes a source of oxygen under pressure, suitable lines leading to a distributing valve which is controlled by the cam shaft of the engine and suitable lines leading from the distributing valve to the individual cylinders. The apparatus also includes a one way check valve to avoid back feed of exhaust gas into the oxygen system.

6 Claims, 5 Drawing Figures

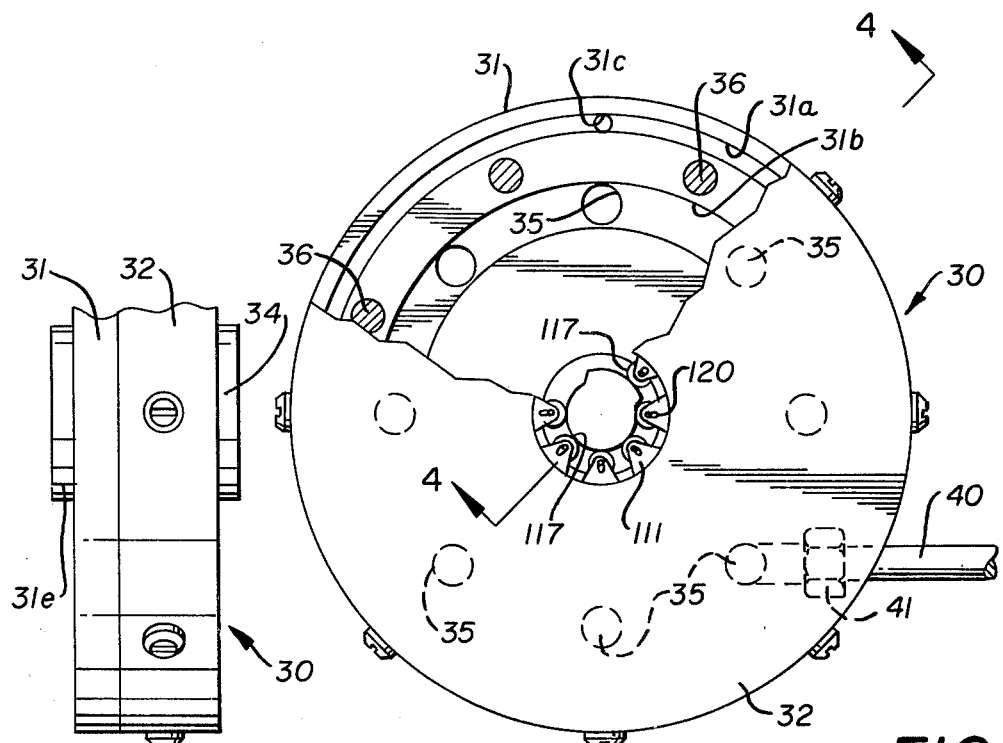
FIG. 3
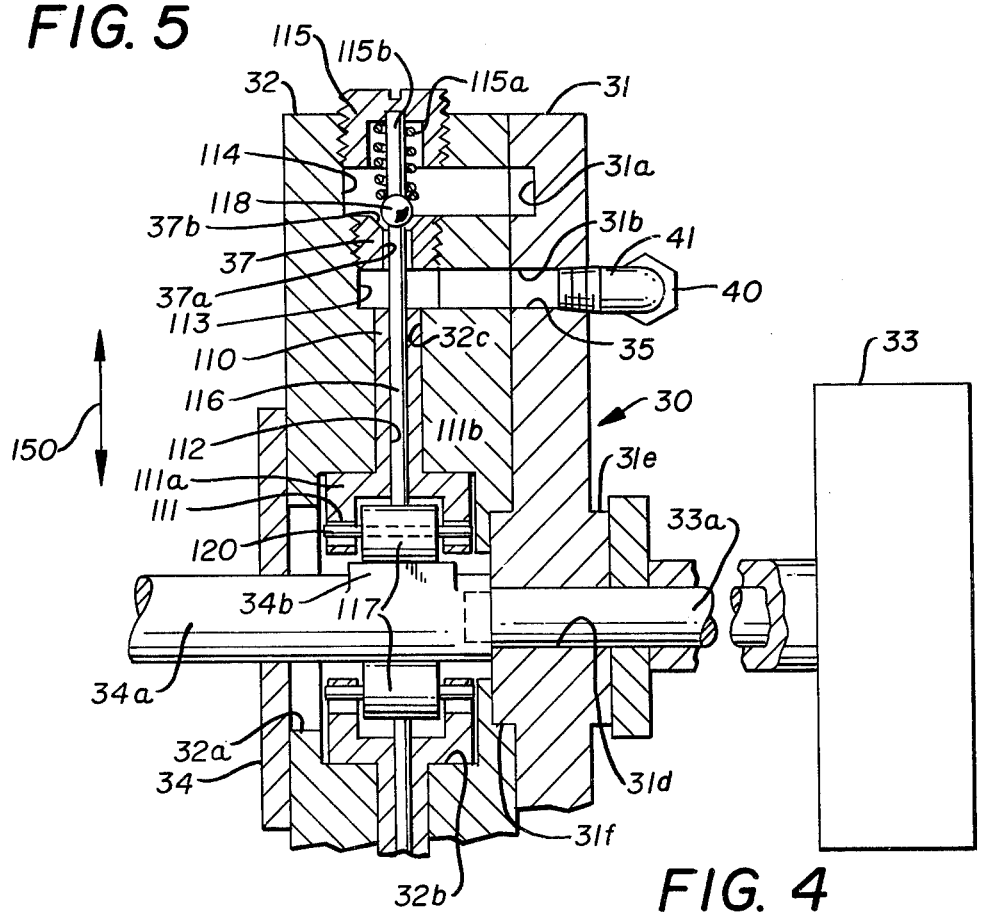
FIG. 5
FIG. 4

METHOD AND APPARATUS FOR INCREASING THE POWER OF INTERNAL COMBUSTION ENGINES BY OXYGEN INJECTION

BACKGROUND OF THE INVENTION

This invention in general relates to the field of internal combustion engines, either diesel or gasoline, and in particular relates to engines of this type wherein the power and efficiency of the engine is increased by the step of injecting pure oxygen into the combustion chamber just after ignition of the fuel mixture.

PRIOR ART STATEMENT

It has been known, of course, that the higher the ratio of oxygen to the fuel or components of the fuel mixture in an internal combustion engine the greater the efficiency thereof because of the inherent combustible characteristics of the oxygen.

Many attempts have been made to improve the efficiency of this mixture by modifying the carburetion devices on such engines.

Furthermore, some of these attempts have been included utilizing pure or nearly pure oxygen.

For example, Giffard U.S. Pat. No. 820,712 discloses supplying pure or nearly pure oxygen to the engine primarily by injecting it into the carburetor intake.

Sabathe U.S. Pat. No. 883,240 also discloses utilization of a supply of oxygen under pressure and discloses reusing or recycling exhaust gases for this purpose.

Diesel U.S. Pat. No. 890,620 discloses supplying the oxygen under pressure in which the process involves injecting previously oxygenated fuel into a body of compressed air in the compression space of the engine.

Winand U.S. Pat. No. 970,152 discloses the utilization of atmospheric air, pure oxygen or mixtures of air and oxygen as oxidizing means for fuel in order to obtain a greater output for the engine.

Jaubert U.S. Pat. No. 1,099,445 is primarily directed to submarine use and discloses the utilization of the exhaust gases to produce oxygen which is then mixed into the fuel mixture.

Shaver U.S. Pat. No. 1,343,938 also illustrates an attempt to produce an oxidizing gas and inject it into the manifold.

Landt U.S. Pat. No. 1,798,126 is directed primarily to a liquid air motor as contrasted to a combustion engine.

While the aforementioned prior art has disclosed the desirability of the utilization of oxygen somewhere in the combustion chain, none of the art discloses the concept disclosed herein of injecting the pure oxygen, under pressure, directly into the combustion chamber just after firing or ignition by the spark plug or other ignition means.

SUMMARY OF THE INVENTION

Accordingly, it is an object of this invention to produce an internal combustion type engine wherein improved combustion is obtained, horsepower is increased, gas mileage is increased and emissions are reduced.

In order to accomplish this object, it has been found possible to provide, in connection with an internal combustion engine, a source of oxygen under pressure tied by an appropriate connecting line or tube to a distributing valve which in turn has a number of egress ports which are individually connected to the combustion chambers of the various cylinders of the engine. This arrangement permits the direct injection of the oxygen into the combustion chamber immediately following ignition.

It has been found that, for example, the normal fuel-air mixture is one part fuel, such as gasoline for example, three parts oxygen and eleven parts nitrogen and other non-combustible gases. With the method and apparatus of the present invention, this ratio can be improved, for example, to one in which the mixture includes one part fuel, six parts oxygen and eight parts nitrogen or other non-combustibe fuels. The result is to give a more complete burn of the fuel in the combustion chamber. The further result of this is to produce more horsepower by the engine, reduce fuel consumption and reduce emissions. This occurs because the fuel is used more efficiently and a more complete "burn" is achieved.

Thus, in practice, it has been found in tests that nearly 60% combustion of the fuel is achieved with applicant's method and apparatus. Furthermore, the gas mileage is believed to be increased in the order of three times and exhaust emissions are drastically reduced. Additionally, it has been found, for example, that in trials with a 428 cubic inch engine which would normally produce, under normal conditions, 275 horsepower, that up to 425 horsepower are produced by using applicant's method and apparatus.

Accordingly, production of an improved method and apparatus for increasing the efficiency of combustion engines of the character described above becomes the principal object of this invention with other objects thereof becoming more apparent upon a reading of the following brief specification, considered and interpreted in view of the accompanying drawings.

OF THE DRAWINGS

FIG. 3 is a plan view partially broken away and in section of the distributing valve.

FIG. 4 is a sectional view taken along the line 4—4 of FIG. 3.

FIG. 5 is a partial elevational view of the distributing valve of FIG. 3.

BRIEF DESCRIPTION OF THE PREFERRED EMBODIMENT

Before describing the preferred embodiment of the method and apparatus which is the subject of this application, attention is directed to two points.

First of all, quite a bit of the structure of the apparatus has been shown schematically because some of the components such as the check valve, the pressurized oxygen cylinder and the combustion chamber are essentially conventional in nature and well known to anyone skilled in the art.

Second, the invention is essentially being illustrated in conjunction with an internal combustion engine such as, for example, might be found in an ordinary passenger automobile. The invention, however, is not intended to be so limited and is believed to have equal utility with other internal combustion engines such as diesel engines or engines operated by natural gas.

Figure 1:
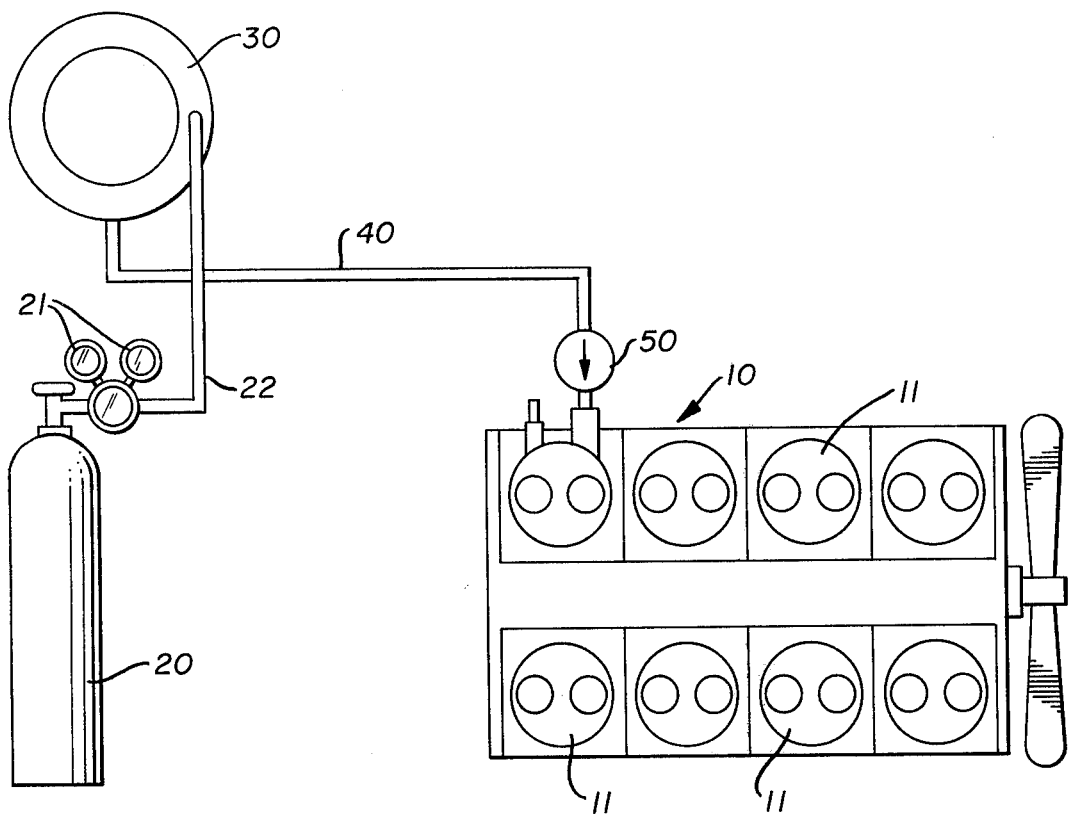
FIG. 1 is a schematic view showing the essential components of the improved apparatus.

Turning then to FIG. 1 for a description of the overall system, it will be noted that an engine block 10 is illustrated having a plurality of combustion chambers 11, 11 which are eight in number in the illustration. A source of oxygen under pressure indicated by the numeral 20 is also provided with this source having the usual metering valves 21, 21.

The oxygen source 20 is connected by the appropriate line 22 to a distributing valve 20 which, in turn, has a plurality of outlet ports which are individually connected to the cylinders 11, 11 by means of line 40. Interposed in the line 40 is a check valve 50 to prevent any back flow of exhaust gasses into the oxygen system.

In FIG. 1, the schematic illustration illustrates only one line 40 leading from distributing valve 30 to one of the cylinders 11. It will be understood, however, that a similar line and check valve will communicate with each of the cylinders which, in the form of the invention illustrated, are eight in number but which, of course, could be of any desired number. It should also be noted that these lines would lead from valve 30 to the appropriate cylinder in accordance with the firing order of the particular engine. The proper arrangement would be apparent to one skilled in this art depending on the engine involved.

Figure 2:
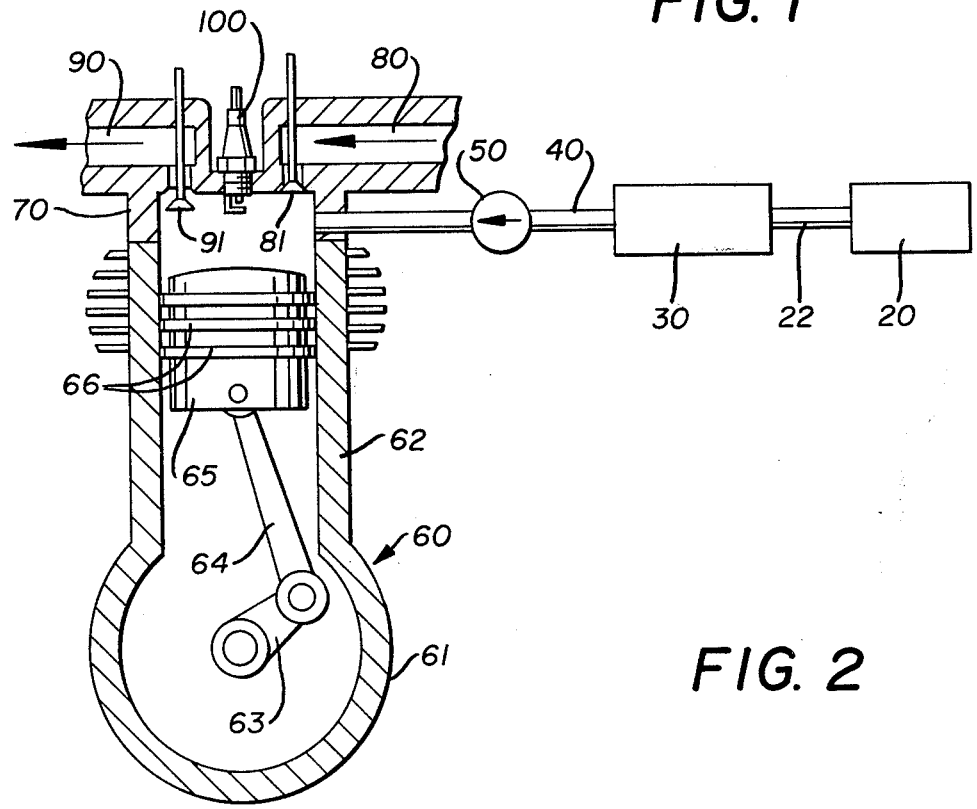
FIG. 2 is a partial sectional view of the combustion chamber including schematically some of the other components of the system.

Referring next to FIG. 2 then, it will be seen that the combustion system 60 itself is essentially conventional and includes a crank case 61, a cylinder body 62 and a crank shaft 63. The crank shaft 63 has the usual connecting rods 64 connected to the piston 65 which, in turn, has the usual piston rings 66, 66 for sealing purposes.

Received on the top of the cylinder 62 is the head 70 which includes and is connected to an inlet line 80 from the carburetor (not shown) and an exhaust line 90. Suitable cylinder valves 81 and 91 are provided in the head to open up or close off the intake and exhaust lines 80 and 90 in conventional fashion. Finally, a spark plug 100 is also illustrated to provide the ignition.

With reference to FIG. 2, it will be noted that line 40 is shown leading from distributing valve 30 into the head 70. The distributing valve 30, in turn, is interconnected, as is shown schematically, through the line 22 to the oxygen source 20.

Turning next then to FIGS. 3, 4 and 5 for a description of the distributing valve 30, it will be noted that the valve essentially is composed of two plates 31 and 32 secured together by suitable bolts 36.

With further regard to this distributing valve 30, it will be seen that one face of the top plate 31 contains a first annular groove 31a and a second concentric annular groove 31b. Groove 31a is in communication with an inlet port 31c which leads to the oxygen source 20 by means of the line 22 so that the oxygen can be forced into the assembly 30 through this aperture and normally remain trapped in the groove 31a until certain valving operations take place as will be described.

The second groove 31b has a plurality of through bores 35, 35 opening into it and disposed about its circumference. These ports 35, 35 lead to the outer or opposed face of plate 31 and are each connected, by fitting 41 to a line 40 which leads to one of the cylinders 11 with the bores 35 corresponding in number to the number of cylinders 11. Upper plate 31 also has a through central bore 31d and axially extending bosses 31e and 31f surrounding that bore.

Lower plate 32 also has a through central bore 32a and a counterbore 32b so that, when the plates 31 and 32 are assembled, the bore 31d of plate 31 and bore 32a and counterbore 32b of plate 32 are in coaxial alignment.

Lower plate 32 is also bored out radially as at 32c (See FIG. 4) to receive the valving components. Only one of these is shown and described in detail but it will be understood that they will correspond in number to the number of cylinders 11 and ports 35.

Referring then to FIG. 4, each of the valving components just referred to include an elongate housing 110 having a U-shaped end 111 which is received within counterbore 32b. This end, which has opposed legs 111a and 111b carries a shaft 120 which in turn carries a roller 117.

An elongate arm 116 is also slidably received within housing 110 and is movable in the direction of arrow 150 as will be described.

Plate 32 also has axial bores 113 and 114 which communicate with each radial bore 32c and are radially located from the centerline of plate 32 so as to register with grooves 31a and 31b and one of bores 35 when plates 31 and 32 are secured together by bolts 36, 36 as is the case in FIG. 4.

Also received within bore 32c is a threaded seat 37 which has a through central axial bore 37a and a ball seat 37b. Additionally, a ball 118 and a cap 115 are received in the radial bore of plate 32. The ball 118 is dimensioned so that, when seated on valve seat 37b, it will close off bore 37a.

A cap 115 is threaded into plate 32 to close off radial bore 32c and also carries spring 115a and an axially extending stop 115b.

A rotor 34a is also received in central bore 32a and counterbore 32b of plate 32. This rotor has an eccentric 34b which, in the form of the invention shown, is 90° long so as to ensure opening of two valves at once as will be described. This rotor 34a is connected to the engine cam shaft by suitable gearing. This gearing is not shown in detail since it is well known. It should also be noted that the 90° rise on rotor 34a is illustrated in conjunction with the eight cylinder engine which has been illustrated herein. This would vary depending on the engine being used.

Connected to rotor 34a in coaxial relationship is a second rotor 33a which operated distributor 33 to control cylinder firing in known fashion.

It should be noted that FIG. 4 illustrates the valve in the open position with eccentric 34b having forced roller 117, and shaft 116 upward to unseat ball 118. This would enable oxygen to flow from groove 31a and bore 114 through bores 37a, 113 and 35 to line 40 and then to the approxiate cylinder 11 as will be described.

In its closed position, once eccentric 34b has been rotated out of contact with roller 117, the spring 115a and oxygen pressure will force the ball 118 to seated position on seat 37b and close off the bores 37a, 113 and 35 as will be described.

It should also be noted that one of the valves 21 will control oxygen flow and be controlled by the ignition system.

In operation of the improved method and apparatus, it will be assumed that the source of oxygen under pressure 20 has been deactivated by valve 21 so that no oxygen is flowing into the line 22 through the aperture 31c into the distributing valve 30. At this point, the ball 118 of each insert 110 is seated and all lines 40 to the cylinders are closed.

At this time, once the engine ignition is begun oxygen will be injected into distributing valve 30 and the cam shaft begins operating, the rotor 34a will turn in response to the gear train leading from the cam shaft. As the eccentric 34b approaches one of the valves the eccentric will strike the roller 117 causing the shaft 116 to be moved in the direction of the arrow 150, thereby unseating ball 118 and permitting the oxygen to flow through the bores 37a, 113 and 35 through line 40 and into the appropriate cylinder 11.

Inasmuch as the rotor 34b also drives the distributor 33, the appropriate valve will be actuated in conjunction with the firing of the appropriate spark plug 100. In this fashion, the oxygen will be delivered to the combustion chamber C of the appropriate cylinder 11. Thus both oxygen distributing valve 30 and the distributor 33 are operated by the cam shaft.

It has been found desirable to time this operation so that the manifold and carburetion system of the conventional engine operate as normal. The only difference is the interjection of the distributing valve into the system and the timing of the same so that the oxygen injection into the combustion chamber C occurs preferably approximately one (1) degree after firing of the spark plug. In other words, the engine operation is normal except for that feature and until that time. Thus, assuming the engine is timed to fire at five (5) degrees beneath top dead center, the oxygen injection begins at four (4) degrees and continues until two (2) degrees before bottom dead center and the resulting improved complete combustion of the fuel mixture is obtained.

As noted above, this increases the horsepower of the engine, reduces fuel consumption and virtually eliminates pollutants going out the exhaust to the atmosphere because a much more complete combustion or burning of the fuel is achieved.

Additionally, while reference has been made to the "usual" carburation system, it has been found that the improved results obtained by the present invention may also permit that system to be modified to reduce the normal amount of fuel received from the carburator.

It should also be noted that the one way check valve 50 between distributing valve 30 and cylinder 11 is also employed in each line 40 to minimize any risk of back flow from the combustion chamber into the distributing valve 30 so as to reduce the risk of an explosion being caused at that point.

Furthermore, it should be noted that oxygen source 20 is shown schematically only and it is contemplated that it could be controlled from the interior of the vehicle in an automotive environment for example.

While a full and complete description of the invention has been set forth in accordance with the dictates of the Patent Statutes, it should be understood that modifications can be resorted to without departing from the spirit hereof or the scope of the appended claims.

Thus, while a timing sequence which has been found advantageous has been described, variations are possible.

What is claimed is:

1. A method of increasing the efficiency of an internal combustion engine in which fuel is vaporized with ambient air and drawn into a combustion chamber on an intake stroke; compressed by a piston within the chamber during a compression stroke; ignited to initiate a power stroke; and exhausted during an exhaust stroke; the improvement comprising the step of:
   (A) injecting substantially pure oxygen into the combustion chamber following the intake and compression stroke and after ingnition of the fuel-air mixture contained in the chamber.

2. The method of claim 1 wherein said oxygen is continuously injected into said combustion chamber during the power stroke from the time the cam shaft of said engine is at approximately five (5) degrees from top dead center until said cam shaft reaches approximately two (2) degrees from bottom dead center.

3. In an internal combustion engine including a source of fuel; means for passing fuel vaporized by ambient air into at least one combustion chamber on an intake stroke; means for compressing said vaporized fuel in a compression stroke; means for igniting said fuel to initiate a power stroke and means for exhausting the spent gasses during an exhaust stroke the improvement comprising:
   (A) a source of substantially pure oxygen under pressure; and
   (B) means for injecting said oxygen into the combustion chamber after passage of said fuel into the combustion chamber, compression thereof and actuation of said means for igniting said fuel.

4. The improvement of claim 3 wherein said means for injecting said oxygen includes a one way check valve between said source of oxygen and said combustion chamber.

5. In an internal combustion engine including a source of fuel, a distributor, at least one combustion chamber and means for igniting fuel passed from said source of fuel into said combustion chamber, the improvement comprising:
   (A) a source of oxygen under pressure;
   (B) means for injecting said oxygen into said combustion chamber after passage of said fuel into said combustion chamber and actuation of said means for igniting said fuel; and
   (C) said means for injecting oxygen into said combustion chamber including
      (1) a distributing valve assembly in fluid communication with said source of oxygen and having
         (a) a plurality of normally closed operating valves each of which is connected to one combustion chamber of said engine,
      (2) cam means associated with each of said operating valves;
      (3) a rotor connected to the cam shaft of said engine and the distributor thereof and passing through said distributing valve assembly and carrying an eccentric for actuation of said cam means to open said operating valves.

6. The improvement of claim 4 wherein said operating valves include:
   (A) an elongate valve stem; and
   (B) a roller carried on one end thereof for engagement with said rotor.

* * * * *